United States Patent
Ohrt et al.

(10) Patent No.: US 11,280,992 B2
(45) Date of Patent: Mar. 22, 2022

(54) SPECIMEN DELIMITING ELEMENT, MICROSCOPY METHOD AND MICROSCOPE

(71) Applicant: Carl Zeiss Microscopy GmbH, Jena (DE)

(72) Inventors: Thomas Ohrt, Golmsdorf (DE); Thomas Kalkbrenner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 593 days.

(21) Appl. No.: 15/771,644

(22) PCT Filed: Oct. 14, 2016

(86) PCT No.: PCT/EP2016/074786
§ 371 (c)(1),
(2) Date: Apr. 27, 2018

(87) PCT Pub. No.: WO2017/071978
PCT Pub. Date: May 4, 2017

(65) Prior Publication Data
US 2018/0321480 A1  Nov. 8, 2018

(30) Foreign Application Priority Data
Oct. 28, 2015  (DE) .......................... 102015221044.8

(51) Int. Cl.
*G02B 21/33*  (2006.01)
*G02B 21/34*  (2006.01)
(Continued)

(52) U.S. Cl.
CPC ............... *G02B 21/33* (2013.01); *G01N 1/30* (2013.01); *G02B 21/002* (2013.01); *G02B 21/02* (2013.01); *G02B 21/26* (2013.01); *G02B 21/34* (2013.01)

(58) Field of Classification Search
CPC ........ G02B 21/33; G02B 21/34; G02B 21/26; G02B 21/002; G02B 21/02; G01N 1/30; G01N 21/28; G82Y 15/00; B82Y 15/00
See application file for complete search history.

(56) References Cited

U.S. PATENT DOCUMENTS 6,980,293 B1 * 12/2005 Harada .............. G01N 21/6458
356/246
2003/0229189 A1  12/2003 Takayama et al.
(Continued)

FOREIGN PATENT DOCUMENTS

DE  14 72 294 A1  2/1969
DE  26 55 041 C2  4/1982
(Continued)

OTHER PUBLICATIONS

Concise Explanation of the International Preliminary Report on Patentability and Written Opinion of International Searching Authority.
(Continued)

*Primary Examiner* — Alicia M Harrington
(74) *Attorney, Agent, or Firm* — Duane Morris LLP (57) ABSTRACT

Specimen delimiting element which, at least in one region, has a nano-porous material which is transparent to at least one observation radiation which is capturable by means of a microscope. The nano-porous material has pores, the mean pore diameter of which is smaller than the wavelength of the observation radiation, and a proportion of at least 5% of the volume of the nano-porous material is taken up by the pores at least in portions of said nano-porous material. The material has an open porosity, the mean pore diameter is at most 1000 nm, and the number of pores per unit volume of the nano-porous material and/or the mean pore diameter changes/change along at least one extent of the specimen delimiting element, such that a pore gradient is formed in the
(Continued)

specimen delimiting element, and has at least one gradient portion in which no porosity is present, such that a separation of a specimen medium on one side surface of the specimen delimiting element and an immersion medium on an opposite side surface of the specimen delimiting element is effected by means of the specimen delimiting element. The invention furthermore relates to a microscopy method and to a microscope using the specimen delimiting element.

10 Claims, 7 Drawing Sheets (51) Int. Cl.
  *G02B 21/00* (2006.01)
  *G02B 21/02* (2006.01)
  *G02B 21/26* (2006.01)
  *G01N 1/30* (2006.01)

(56) References Cited

U.S. PATENT DOCUMENTS

| | | |
|---|---|---|
| 2007/0128069 A1 | 6/2007 | Louis et al. |
| 2013/0170044 A1 | 7/2013 | Mont et al. |
| 2014/0334006 A1 | 11/2014 | Adib et al. |
| 2016/0154236 A1* | 6/2016 | Siebenmorgen ... G02B 21/0032 359/385 |

FOREIGN PATENT DOCUMENTS

| | | |
|---|---|---|
| DE | 10 2011 076 238 A1 | 11/2012 |
| DE | 10 2013 107 297 A1 | 1/2015 |
| DE | 10 2013 107 298 A1 | 1/2015 |
| DE | 102013107297 A1 | 1/2015 |
| JP | 2005234458 A | 9/2005 |
| JP | 2012131695 A | 7/2012 |

OTHER PUBLICATIONS

Nam, Yun-Suk, et al.; "Thick, three-dimensional nanoporous density-graded materials formed by optical exposures of photopolymers with controlled levels of absorption"; Applied Optics 2007; 46(25):6350-6354.
English translation of Chinese Office Action for Chinese Patent Application 201680067208.2 dated Dec. 27, 2019.
Translation of Japanese Office Action for Patent Application No. JP 2018-521867 dated Jul. 22, 2020.
Nam;"Thick 3-dimensional nanoporous density-graded materials formed by optical exposures of photopolymers w/controlled levels of absorption";Applied Optics;46(20):6350-6354.
Li;"Porous Polymer Films and Gradient-Refractive-Index Structure for Broadband & Omnidirectional Antireflection Coatings";Advance Functional Materials 2010;20:259-265.
Elmer, T.H.; "Porous and reconstructed Glasses"; Engineered Materials Handbook, Ceramic and Glasses 1992; 4:427-432.
International Search Report, Jan. 2015.
German Search Report dated Jun. 6, 2016.

* cited by examiner

SPECIMEN DELIMITING ELEMENT, MICROSCOPY METHOD AND MICROSCOPE

RELATED APPLICATIONS

The present application is a U.S. National Stage application of International PCT Application No. PCT/EP2016/074786 filed on Oct. 14, 2016 which claims priority benefit of German Application No. DE 10 2015 221 044.8 filed on Oct. 28, 2015, the contents of each are incorporated by reference in their entirety.

FIELD OF THE INVENTION

The invention relates to a specimen delimiting element as claimed in the preamble of claim 1. The invention furthermore relates to a microscopy method and to a microscope.

The use of immersion objectives affords numerous advantages in microscopy, all of which advantages ultimately result from the higher achievable numerical apertures of the immersion objectives. Said advantages are, for example, a higher spatial resolution, a higher light gathering efficiency, a better signal-to-noise ratio and/or a better signal-to-background ratio, shorter exposure times and a better temporal resolution and also a reduced phototoxic effect on biological specimens. The latter advantage is of great importance particularly in the microscopy of biological specimens, for example living cells and/or biologically active molecules.

The numerical aperture can be maximized by the use of immersion objectives in cooperation with immersion media, wherein the respective immersion medium has the highest possible refractive index. In this case, the specimen to be observed is covered with a thin cover glass or the specimen is applied to a cover glass and the immersion medium is applied to that side surface of the cover glass which faces away from the specimen. The cover glass prevents intermixing of immersion medium and specimen medium and contamination of the specimen by the immersion medium.

Known immersion media include for example oil, oily substances and deformable transparent plastics, such as are described for example in DE 14 72 294 A.

An expedient upper limit of the refractive index of the immersion medium is given by the refractive index of the cover glass. If the refractive indices of immersion medium and cover glass are identical, then the cover glass is no longer optically effective and causes no imaging aberrations during the observation of the specimen.

Such matching of the refractive indices is typically achievable by means of oil immersion objectives and oil as immersion medium.

Biological specimens, in particular, are usually present in a specimen medium in order at least temporarily to maintain the native properties of the specimen or the constituents thereof.

If the refractive index of the specimen medium deviates from the refractive index of the cover glass and/or of the immersion medium, which is often the case with biological specimens, with oil immersion objectives optimum work can be carried out only in focal planes very near the cover glass, since aberrations, principally spherical aberrations, occur as a result of the sudden change in refractive index, which aberrations increase with the depth of the focal plane in the specimen.

Therefore, water-immersion objectives are better suited to microscopy, in particular on living cells. Since the cells are situated in an aqueous specimen medium, the refractive indices of immersion medium and specimen medium are very similar. Only the refractive index of the cover glass deviates.

If the optical effect of the cover glass is eliminated by correction, no spherical aberrations occur as the focal plane penetrates more deeply into the specimen.

However, such a correction is specific to a cover glass of specific thickness, planarity and glass type, for which reason, in particular, water immersion objectives are usually equipped with a correction functionality which can be used to correct fluctuations of the cover glass thickness that are unavoidable in a manner governed by production as a result of the displacement of a lens or lens group in the immersion objective.

Since even cells are not examined by microscopy in purely aqueous solution and cells additionally have a different refractive index than the specimen medium, a wide variety of immersion media are available. Typical immersion media for the microscopy of living cells are water, organic replacement media for water, glycerol, TDE and specific immersion oils such as e.g. silicone oil.

All the immersion media are liquid at customary temperature. It is only if the immersion medium has exactly the same optical parameters as the specimen medium that an optimum image quality and also maximum signal intensity and penetration depth are achieved.

Limitations and disadvantages therefore occur with the use of immersion objectives and in the case of microscopy by means of immersion media. In this regard, the cover glass usually has different optical properties than the immersion medium, with the result that special objectives, in particular immersion objectives, are required. The immersion medium usually has different optical properties than the specimen medium, as a result of which the performance even of the special objectives decreases. This results principally in spherical aberrations and chromatic aberrations at relatively high penetration depths of the focal plane.

However, even corrected special objectives are highly sensitive to cover-glass-induced aberrations. Such aberrations are for example aberrations that occur on account of a cover glass positioned in a skew fashion in the beam path of the microscope. Aberrations also occur if the side surfaces are not parallel to one another or the cover glass is skew with respect to the optical plane. Fluctuations of the thickness of the cover glass likewise lead to aberrations, wherein the intensity of the aberrations scales approximately proportionally with the difference in refractive index between cover glass and immersion medium.

On the part of the implementation of a suitable microscope, a special objective must be present in the repertoire for each immersion medium, for the reasons mentioned above. Such special objectives are for example oil immersion objectives, silicone oil immersion objectives, glycerol immersion objectives and water immersion objectives. With technically and economically tenable outlay, only one correction functionality is implementable in each case per special objective. By way of example, either a cover glass thickness correction or a refractive index immersion medium correction, for example by means of a multi-immersion objective, is provided.

As an alternative to a multiplicity of special objectives, a specially designed immersion objective can be used, as is known for example from DE 26 55 041 C2. The immersion objective disclosed therein has a plate composed of a transparent material in front of the front lens, said plate being displaceable along the optical axis. The thickness of the space between the plate and a cover glass that is filled by an immersion medium is adjustable for the purpose of correcting the refractive index of different immersion media and the thickness of the cover glass.

DE 10 2013 107 297 A1 discloses a covering of a specimen, wherein the covering consists of a nano-porous material of open porosity and is transparent to an observation radiation which is capturable by means of a microscope. The mean pore diameter of the material is smaller than the wavelength of the observation radiation.

US 2007/0128069 A1 discloses a porous cover glass, the pores of which extend from one side surface to the opposite side surface. The cover glass is provided with a membrane that is likewise porous throughout. A very similar membrane having a filter function for cells and cell constituents is known from DE 10 2011 076 238 A1.

Nano-porous materials are additionally also used in other technical fields and employed for example in scratch-resistant optical filters, as is described for example in US 2013/0170044 A1 and US 2014/0334006 A1.

DESCRIPTION OF THE INVENTION

The invention is based on the object of proposing a possibility by means of which the disadvantages and limitations known from the prior art in the case of microscopy using immersion media are at least reduced.

The object is achieved by means of a specimen delimiting element as claimed in independent claim 1, a microscopy method as claimed in claim 8, and a microscope as claimed in claim 10. Advantageous configurations are specified in the dependent claims.

The object is achieved by means of a specimen delimiting element which, at least in one region, consists of a nano-porous material which is transparent to at least one observation radiation which is capturable by means of a microscope, the mean pore diameter of which is smaller than the wavelength of the observation radiation. What is characteristic of a specimen delimiting element according to the invention is that the nano-porous material is a nano-porous material having an open porosity and has pores having a mean pore diameter of at most 1000 nm. A proportion of at least 5% of the volume of the material is taken up by the pores. The number of pores per unit volume of the nano-porous material and/or the mean pore diameter changes or change along at least one extent of the specimen delimiting element, such that a pore gradient is formed in the specimen delimiting element. The pore gradient comprises a pore-free layer.

The proportion of the volume of the material that is constituted by the volume of all the pores is also referred to as volume fraction.

In the case of an open porosity, the pores, at least a large portion thereof, are interconnected.

In one possible embodiment of the specimen delimiting element, the mean pore diameter is determined on the basis of a distribution function. That diameter which 95% of all the pores have, minus and/or plus the standard deviation thereof, is determined as the mean pore diameter.

The essence of the invention is a specimen delimiting element which at least partly implements the optical properties of an immersion medium applied on the specimen delimiting element and which simultaneously fulfills the traditional function of a cover glass, namely the separation of specimen medium and immersion medium.

In order to ensure the separation of specimen medium and immersion medium, the pore gradient has at least one gradient portion in which no porosity is present. In this way, a separation of the specimen medium on one side surface of the specimen delimiting element and an immersion medium on an opposite side surface of the specimen delimiting element is made possible by means of the specimen delimiting element.

The specimen delimiting element according to the invention has for example the dimensions of a commercially available cover glass of, for example, 18×18 mm, 22×22 mm or 24×40 mm with thicknesses of 0.02 to 0.21 mm. The specimen delimiting element can also be embodied with individual dimensions, designs and/or thicknesses. In further embodiments, the specimen delimiting element can be designed for multi-well plates or for containers such as Petri dishes.

In a further possible embodiment, the specimen delimiting element is embodied as a hollow cylinder. This embodiment makes it possible, for example, to position the specimen in the interior of the specimen delimiting element and to examine the specimen by microscopy. This design of the specimen delimiting element is advantageously useable in the light sheet microscopy method and/or laser scanning microscopy.

The optical properties of the specimen delimiting element are advantageously adaptable to individual immersion media. To that end, the specimen delimiting element consists of the nano-porous material at least regionally. The nano-porous material forms a region of the specimen delimiting element through which the observation radiation passes when the specimen delimiting element is used in a microscope.

On account of the high effective internal surface area of the nano-porous material, the specimen delimiting element takes up the respective immersion medium and/or the specimen medium. In this case, the mean pore size of the pores of the nano-porous material has to be small relative to the wavelength of the observation radiation in order that the specimen delimiting element filled with the medium, in particular with the immersion medium and/or the specimen medium, is an optically homogeneous object having an effective refractive index lying between the refractive index of the material and that of the immersion medium. In this case, the exact value depends on the respective volume fraction $\varphi = V_{material}/V_{pores}$, wherein $V_{material}$ is the volume of the material and $V_{pores}$ is the volume of the pores.

For dielectric media, the effective refractive index $n_{eff}$ results to a good approximation as:

$$n_{eff} = \sqrt{(1-\varphi)n_1^2 + \varphi n_2^2} \tag{1}$$

wherein n1 and n2 are the refractive indices (indices of refraction) of the respective media.

Besides the effective refractive index, $n_{eff}$ consideration should also be given to the scattering properties of the specimen delimiting element, since the pores act as scattering centers. The scattering properties thereof can be estimated using the Mie scattering theory, and likewise the scattering and extinction coefficients of a nano-porous material having volume fraction $\varphi$ and mean pore size.

It is advantageous if the mean pore diameter has a variance of not more than ±10 percent. A low variance enables more precise matching of the effective refractive index $n_{eff}$ and local inhomogeneities of the effective refractive index $n_{eff}$ are reduced.

Matching of the effective refractive index $n_{eff}$ is possible in particular by means of the choice of the volume fraction and/or the mean pore diameter of the pores. In this case, the material of the specimen delimiting element and the optical properties thereof are additionally taken into account.

The observation radiation is an electromagnetic radiation, in particular light, which is detectable by means of a detector unit. The detector unit is for example the human eye, a camera, an infrared camera (IR camera), a UV-sensitive camera (UV=ultraviolet light), a CCD (charge couple device) camera, a detector of a laser scanning microscope and/or a CMOS (complementary metal oxide semiconductor) chip.

The wavelength of the observation radiation is selected from a wavelength range of 200 to 2000 nm, as a result of which the specimen delimiting element is useable for a wide field of use in microscopy.

In further embodiments of the specimen delimiting element, the wavelength of the observation radiation is selected from a wavelength range from 200 to 850 nm, for example from a wavelength range of 380 nm to 780 nm.

The mean pore diameter is in a value range of 0.5 nm to 100 nm. In order to further reduce the scattering effects that occur, the mean pore diameter is advantageously chosen in a value range of 1 nm to 10 nm.

Along the pore gradient the optical properties of the specimen delimiting element are adjustable depending on the concrete configuration of the pore gradient. Furthermore, the distribution of a medium, for example of an immersion medium, is adjustable by means of the configuration of the pore gradient or pore gradients within the specimen delimiting element.

In one particular embodiment of the specimen delimiting element, two pore gradients are formed therein, which pore gradients respectively proceed from a side surface of the specimen delimiting element. The side surfaces are opposite one another, such that the pore gradients run toward one another. The pore gradients are formed in a mutually opposing fashion with regard to the number of pores per unit volume of the material and/or the mean pore diameter. In particular, each of the pore gradients has a high number of pores per unit volume of the material (pore density) and/or a large mean pore diameter. The pore density and/or the mean pore diameter decreases or decrease in the direction of the opposite side surface.

This embodiment supports penetration of the immersion medium and/or of the specimen medium at the respective side surfaces. The two media remain separated from one another, however, owing to the very low to absent pore density and/or the very low mean pore diameter in the interior of the specimen delimiting element, for example in a plane or pore-free layer in the interior of the specimen delimiting element.

In a further possible embodiment, the specimen delimiting element, in particular the pores thereof, are filled with a solidified or liquid medium having known optical properties, wherein the solidified or liquid medium remains in the specimen delimiting element.

Such a specimen delimiting element is implemented or implementable with a matched effective refractive index for water immersion objectives or for so-called "LiveCell immersion objectives". Thus, by comparison with the prior art, it is advantageously possible to realize the optically optimum situation of the non-existent specimen delimiting element for specimens in specimen media such as buffer solutions or embedding media.

This embodiment makes it possible to provide the specimen delimiting element having the desired optical properties for example in the form of a prepared and immediately useable specimen delimiting element which is filled with the solidified or liquid medium. By way of example, this obviates a method step in which the specimen delimiting element is wetted with the immersion medium and the immersion medium penetrates into the specimen delimiting element, with the result that fewer handling errors can occur and less time is needed for the preparation of the actual microscopy process.

The nano-porous material can be a glass, a plastic or a plastics mixture. The production of nano-porous materials is known for example from US 2003/0229189 A1. The specimen delimiting element can consist for example of at least one of the nano-porous materials disclosed in US 2003/0229189 A1 and/or in the article "Porous and reconstructed Glasses" (T. H: Elmer, 1992, Engineered Materials Handbook, Vol. 4, Ceramic and Glasses: 427-432).

In order to produce a specimen delimiting element, it is possible to use a nano-porous material having a mean pore diameter of at most 1000 nm and a proportion of at least 5% by volume of the material formed by the pores.

In a further configuration of the use of nano-porous material for producing a specimen delimiting element, a nano-porous material is used which is transparent to an observation radiation and the mean pore diameter of which is smaller than the wavelength of the observation radiation.

In this case, the wavelength of the observation radiation is in a wavelength range of 200 to 2000 nm, for example in a wavelength range of 200 to 780 nm, and in further embodiments in a wavelength range of 380 nm to 780 nm.

The object is furthermore achieved in a microscopy method. The microscopy method comprises the following steps:

Providing a specimen delimiting element according to the invention and providing a specimen. The specimen delimiting element provided may already have been filled with a solidified or liquid medium, in particular with an immersion medium and/or with a specimen medium. The specimen is delimited for example covered or encompassed, by the specimen delimiting element. If the pores of the specimen delimiting element have not yet been filled, they are filled with an immersion medium and/or with a specimen medium.

The method then comprises wetting the specimen delimiting element with an immersion medium and contacting an immersion objective with the immersion medium. The specimen is observed by detecting at least one beam of the observation radiation through the immersion objective and through the specimen delimiting element.

The detection of the observation radiation can be carried out by the human eye. In further configurations, a detection unit as already explained above is used, by means of which optionally besides the detection of the observation radiation the data-technological acquisition, storage and/or evaluation thereof is also made possible.

In one configuration of the microscopy method, a specimen embedded in an embedding medium is provided as the specimen.

In a further configuration of the microscopy method, the embedded specimen is covered with a specimen delimiting element, wherein the embedded specimen is contacted with a side surface of the specimen delimiting element that has pores, that is to say is porous.

This configuration of the microscopy method is suitable for example for the automated examination of embedded specimens by microscopy, since air that may have remained below the specimen delimiting element can escape via the pores and an undesired inclusion of air bubbles is thus avoided.

By way of example, an immersion oil, water, glycerol or a mixture comprising water and glycerol, for example, is useable as the immersion medium.

A microscope comprising a specimen slide mount for mounting a specimen slide is suitable for implementing the microscopy method.

The specimen slide is provided with a specimen delimiting element. In this case, the specimen slide is held in particular in the specimen slide mount and a specimen situated on, in, at or below the specimen slide is delimited by the specimen delimiting element.

In one developed embodiment of the microscope according to the invention, said microscope comprises an immersion media interchange device.

The immersion media interchange device comprises an immersion media feed for feeding an immersion medium to a specimen delimiting element according to the invention. The specimen delimiting element is present on the specimen slide held in the specimen slide mount; in particular, a specimen situated on the specimen slide is delimited, for example covered, by the specimen delimiting element.

The immersion media interchange device furthermore comprises a pump unit for the controlled transport of the immersion medium from a supply container through the immersion media feed to the specimen delimiting element, and a control unit for driving the pump unit.

The immersion media interchange device enables the immersion medium to be exchanged without the specimen and/or the immersion objective having to be interchanged for this purpose.

Furthermore, a correction of the aberration is advantageously made possible by virtue of the fact that, as necessary, a currently used immersion medium is exchanged for a different immersion medium having a different refractive index and aberrations thus ascertained can be corrected.

By way of example, in a further embodiment, the immersion media interchange device enables temperature regulation of the immersion medium, of the specimen delimiting element and/or of the specimen by virtue of the fact that the currently used immersion medium is exchangeable or is exchanged continuously or at specific points in time.

The specimen delimiting element according to the invention, the microscopy method according to the invention and the microscope according to the invention and also the use of nano-porous material for producing the specimen delimiting element according to the invention in each case advantageously enable the refractive index of the specimen delimiting element to be approximated or approximatable to the refractive index of the immersion medium. Aberrations induced by the effect of the specimen delimiting element for example owing to fluctuations of the thickness of the specimen delimiting element, wedge aberrations and/or tiltings are advantageously reduced.

For the microscope according to the invention it is no longer necessary to keep available a traditional objective repertoire with immersion objectives for the respective immersion media. A greater flexibility of the use of the immersion objective or immersion objectives is advantageously achieved for the user of the microscope. Furthermore, the image optimization is automatable and a correction functionality can be entirely dispensed with, since the specimen delimiting elements according to the invention cause reduced aberrations. Consequently, the optical design of the microscope can be simplified without loss of quality.

BRIEF DESCRIPTION OF THE DRAWINGS

The invention is explained in greater detail below on the basis of exemplary embodiments and figures. In the figures.

DETAILED DESCRIPTION OF THE DRAWINGS

The exemplary embodiments are explained with reference to schematic illustrations. Identical reference signs identify identical technical elements.

The microscope 6 partly illustrated in FIGS. 1 to 5 is a microscope 6 suitable for microscopy using an immersion objective 5. For reasons of clarity, the microscope 6 is merely indicated in the illustration and only the components of the microscope 6 which are relevant to the description are shown.

Figure 1:
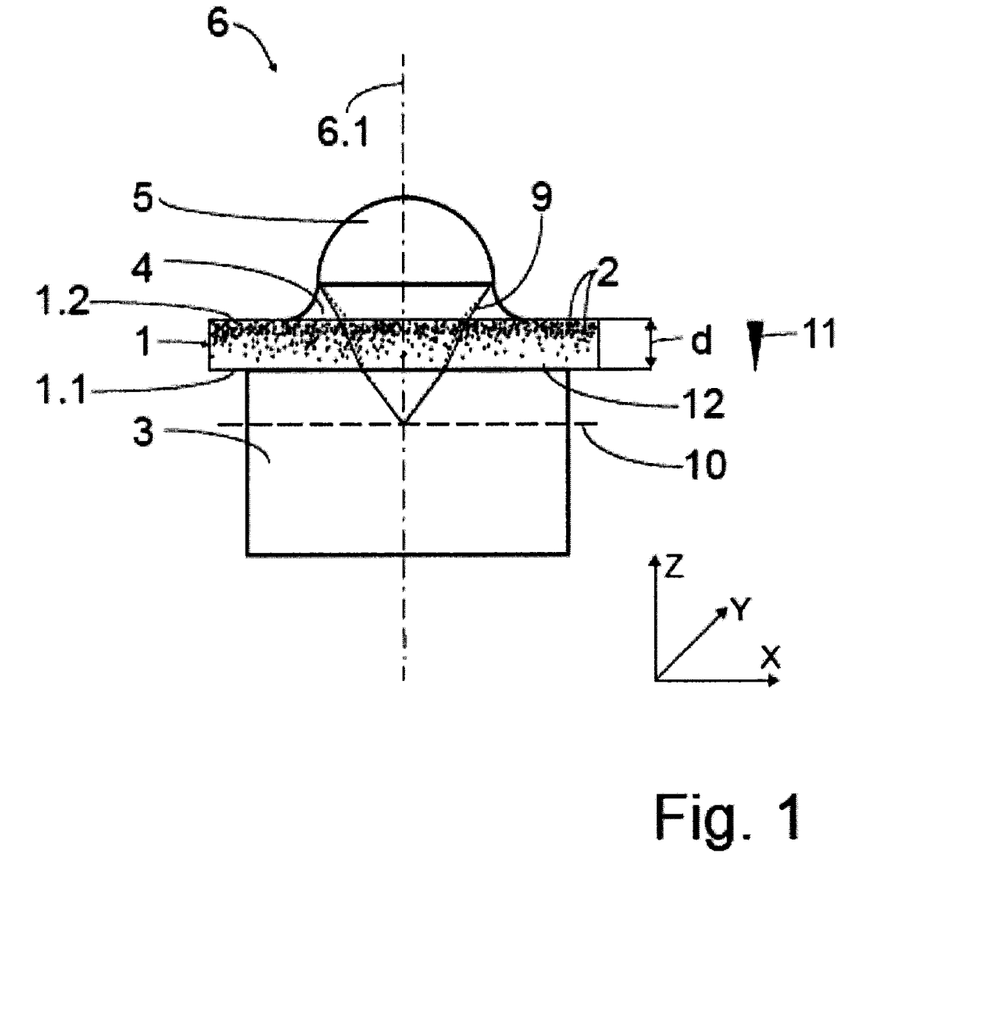
FIG. 1 shows a schematic illustration of a first exemplary embodiment of a specimen delimiting element together with a specimen, an immersion medium and an immersion objective of a microscope.

A first exemplary embodiment of a specimen covering element 1 (sometimes also referred to herein as a delimiting element) is illustrated in FIG. 1 together with a specimen 3, an immersion medium 4 and an immersion objective 5 of a microscope 6.

The specimen delimiting element 1 is placed on the specimen 3 so that one side surface of it, (which is referred to as the specimen-side side surface 1.1), rests on and covers said specimen toward the top (as seen in FIG. 1).

The specimen 3 consists of a biological material, for example a tissue, and is introduced into a specimen medium in order to prevent the biological material from undergoing a structural change, for example as a result of collapse owing to lack of osmotic pressure of the cells of the tissue, and to counteract degradation of the biological material. The native properties of the specimen 3 are at least temporarily maintained by the specimen medium.

The term specimen 3 is used in a generalizing manner for a material to be observed, for example a biological material, and includes a specimen medium present.

On an objective-side side surface 1.2 of the specimen delimiting element 1, the immersion medium 4 in the form of an immersion oil is applied and fills a space between the objective-side side surface 1.2 and the immersion objective 5, which is embodied as an oil immersion objective. Moreover, a proportion of the immersion medium 4 has penetrated into the pores 2, thereby filling the specimen delimiting element 1 with the immersion medium 4.

The specimen 3 is situated on a specimen slide 7 (see FIGS. 6 and 7a to 7c), which is held by a specimen slide mount 8 (see FIG. 6) of the microscope 6 relative to an optical axis 6.1 of the microscope 6.

The immersion objective 5 is arranged on the microscope 6 adjustably in the Z-direction Z along the optical axis 6.1.

The immersion objective 5 is set in the Z-direction Z and focused into a focal plane 10 in such a way that an observation radiation 9 is detectable from the focal plane 10 through the specimen delimiting element 1, the immersion medium 4, the immersion objective 5 and further optical elements (not illustrated) of the microscope 6.

The observation radiation 9 is illustrated by the course of the marginal rays of a beam of the observation radiation 9 with solid lines. The course of the marginal rays schematically indicates the refraction conditions of the observation radiation 9 upon transition from the specimen 3 to the specimen delimiting element 1 and from the specimen delimiting element 1 to the immersion medium 4.

Merely for comparison purposes, FIG. 1 illustrates the course of the marginal rays of a beam of the observation radiation 9 with dashed lines as it would be manifested with the use of a conventional cover glass.

It can be seen that, in particular at the boundary between immersion medium 4 and specimen delimiting element 1, with the use of a conventional cover glass the observation radiation 9 is refracted to a greater extent than is the case with the use of a specimen delimiting element 1 according to the invention.

The specimen delimiting element 1 consists of a nano-porous material having an open porosity, wherein the nano-porous material is pervaded with pores 2 along a pore gradient 11 (symbolized by a triangle). The pores 2, proceeding from the objective-side side surface 1.2 in the direction of the opposite specimen-side side surface 1.1., are distributed with a decreasing pore density, that is to say with a decreasing number of pores 2 per unit volume of the nano-porous material. At the specimen-side side surface 1.1, a pore-free layer 12 is formed in the nano-porous material, said pore-free layer preventing the immersion medium 4 that fills the pores 2 from mixing with the specimen 3 and/or with the specimen medium.

The pores 2 have a mean pore diameter of 5 nm. The (mean) proportion of the volume of the nano-porous material of the specimen delimiting element 1 that is constituted by the volume of the pores, said proportion being referred to as volume fraction $\varphi$, is 0.2 or 20% in the exemplary embodiment.

On the basis of the mean pore diameter of 5 nm and the volume fraction $\varphi$ of 0.2, a scattering coefficient of 0.0028/mm was determined according to the Mie scattering theory. Given a thickness d of the specimen delimiting element 1 of 0.17 mm, the scattering coefficient determined is hardly disadvantageous.

Figure 2:
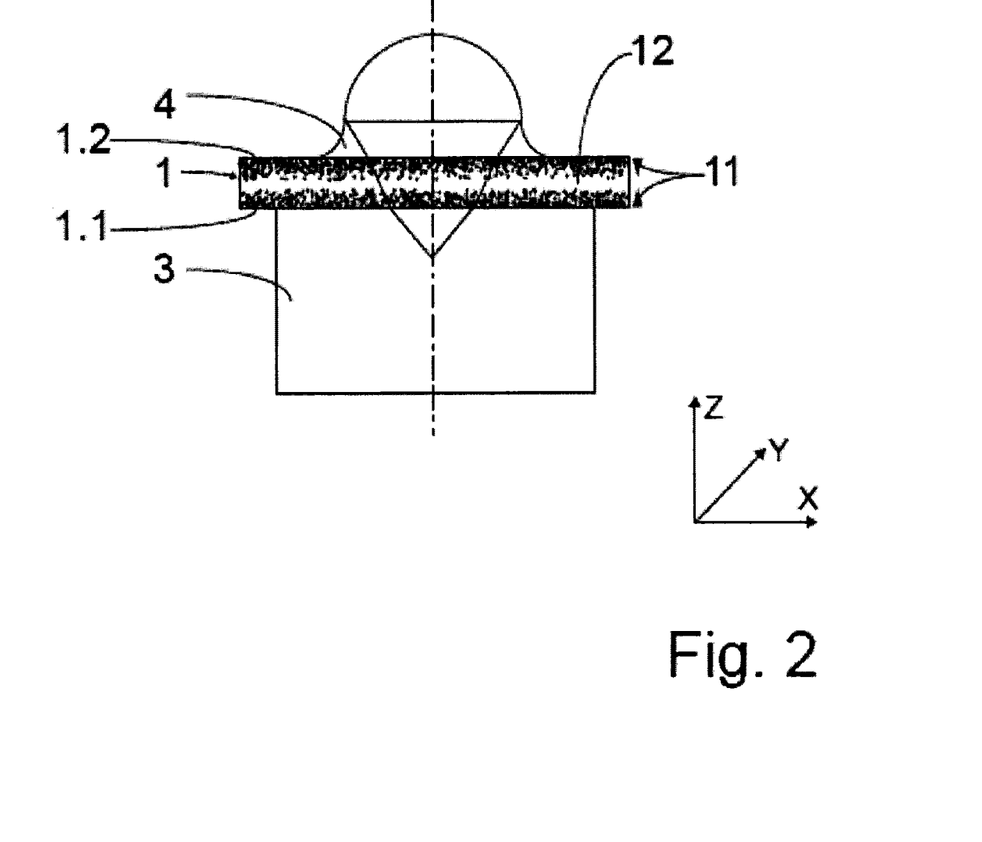
FIG. 2 shows a schematic illustration of a second exemplary embodiment of a specimen delimiting element together with a specimen, an immersion medium and an immersion objective of a microscope.

A second exemplary embodiment of the specimen delimiting element 1 according to the invention is illustrated in a second exemplary embodiment in FIG. 2 with two pore gradients 11 formed in an opposing fashion relative to one another. A respective pore gradient 11 is formed proceeding from the specimen-side side surface 1.1 and from the objective-side side surface 1.2 in the Z-direction Z. In this case, in each of the pore gradients 11 the pore density decreases toward the center of the specimen delimiting element 1, such that a pore-free layer 12 is present in the center of the specimen delimiting element 1. The pore-free layer 12 prevents mixing or contamination of specimen 3 and/or specimen medium and immersion medium 4.

From the specimen-side side surface 1.1, the specimen 3 can penetrate into the pores 2 of the pore gradient 11 proceeding from the specimen-side side surface 1.1 and/or the specimen 3 has penetrated into the pores 2.

The immersion medium 4 can penetrate into the pores 2 of the pore gradient 11 proceeding from the objective-side side surface 1.2 and/or the immersion medium 4 has penetrated into the pores 2.

In further embodiments of the specimen delimiting element 1, at least one of the pore gradients 11 is formed by the mean pore diameter of the pores 2 being varied in addition or as an alternative to the varying pore density.

Moreover, in further embodiments of the specimen delimiting element 1, the pore gradient 11 or the pore gradients 11 is or are formed in an extent of the specimen delimiting element 1 in an X-direction X and/or in a Y-direction Y.

If a plurality of pore gradients 11 are formed in a specimen delimiting element 1, they can be formed identically to one another in further embodiments of the specimen delimiting element 1. By way of example, the pore density and/or the mean pore diameter of the pore gradients 11 increases or decreases in the same X-, Y- and/or Z-direction.

Figure 3:
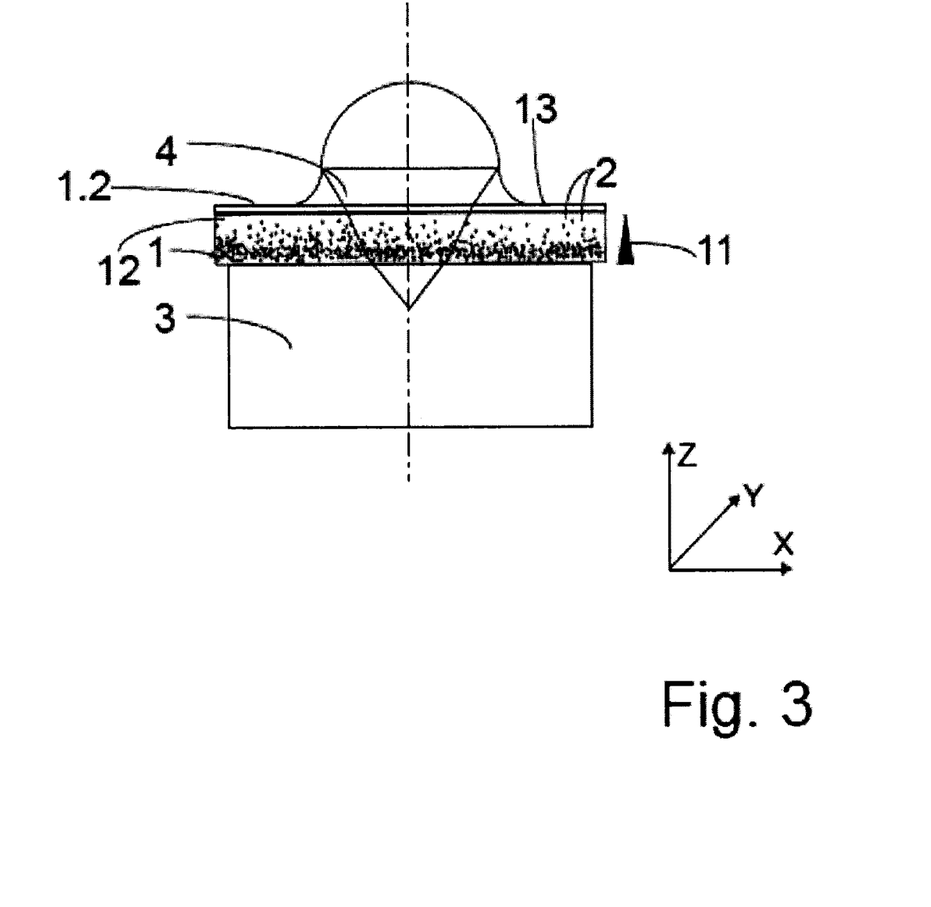
FIG. 3 shows a schematic illustration of a third exemplary embodiment of a specimen delimiting element together with a specimen, an immersion medium and an immersion objective of a microscope.

In addition, the specimen delimiting element 1 according to the invention can comprise one or more sealing layers 13, as is illustrated as a third exemplary embodiment of the specimen delimiting element 1 in FIG. 3. The specimen delimiting element 1 comprises a liquid-tight sealing layer 13 on the objective-side side surface 1.2.

In addition to the pore-free layer 12, the sealing layer 13 prevents the immersion medium 4 from penetrating into the pores 2, while the specimen 3 can penetrate and/or has penetrated into the pores 2. The sealing layer 13 together with the pore-free layer 12 keeps the immersion medium 4 and the specimen 3 separated from one another.

In further embodiments, the sealing layer 13 is formed by a membrane and/or by a coating. The sealing layer 13 may furthermore be a functional coating and enable cell growth.

In further embodiments of the specimen delimiting element 1, the sealing layer 13 is formed at or on the specimen-side side surface 1.1.

A sealing layer 13 at one of the side surfaces 1.1, 1.2 can be produced by brief heating and an associated alteration of the microstructure of the nano-porous material. In further embodiments, a sealing layer 13 is produced for example by means of printing, lacquering, sputtering, adhesive bonding, spin coating and/or lamination on the side surface 1.1, 1.2.

Figure 4:
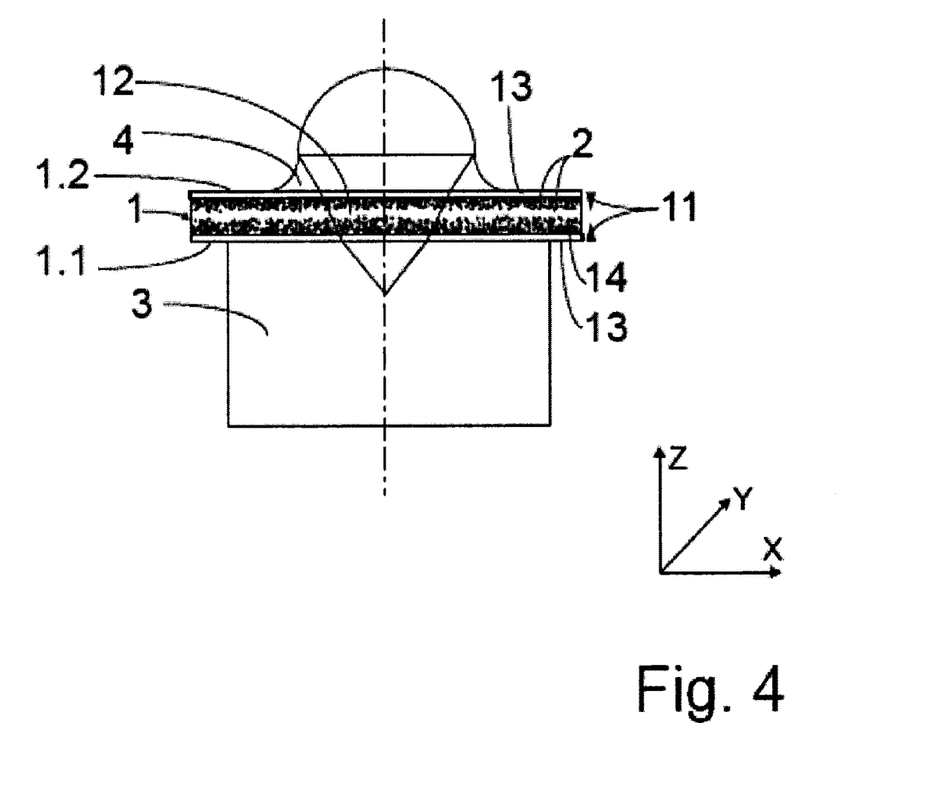
FIG. 4 shows a schematic illustration of a fourth exemplary embodiment of a specimen delimiting element together with a specimen, an immersion medium and an immersion objective of a microscope.

A specimen delimiting element 1 comprising a respective sealing layer 13 both on the specimen-side side surface 1.1 and on the objective-side side surface 1.2 is illustrated in FIG. 4.

In this case, the pores 2 are filled with a solidified or a liquid medium 14 having known optical properties. The refractive index of such a specimen delimiting element 1 is optimally adjustable to a desired effective refractive index $n_{eff}$, for example that of water. The specimen delimiting element 1 adjusted in this way is directly useable for the microscopy and may be provided or have been provided in already prefabricated form. The respective medium 14 in the pore gradients 11 can have different optical properties and be adapted for example to a specimen medium and/or to an immersion medium 4.

In further possible embodiments, all the side surfaces are provided with a sealing layer 13. The pores 2 are filled with a solidified or a liquid medium 14 having known optical properties, which medium remains in the specimen delimiting element 1.

Figure 5:
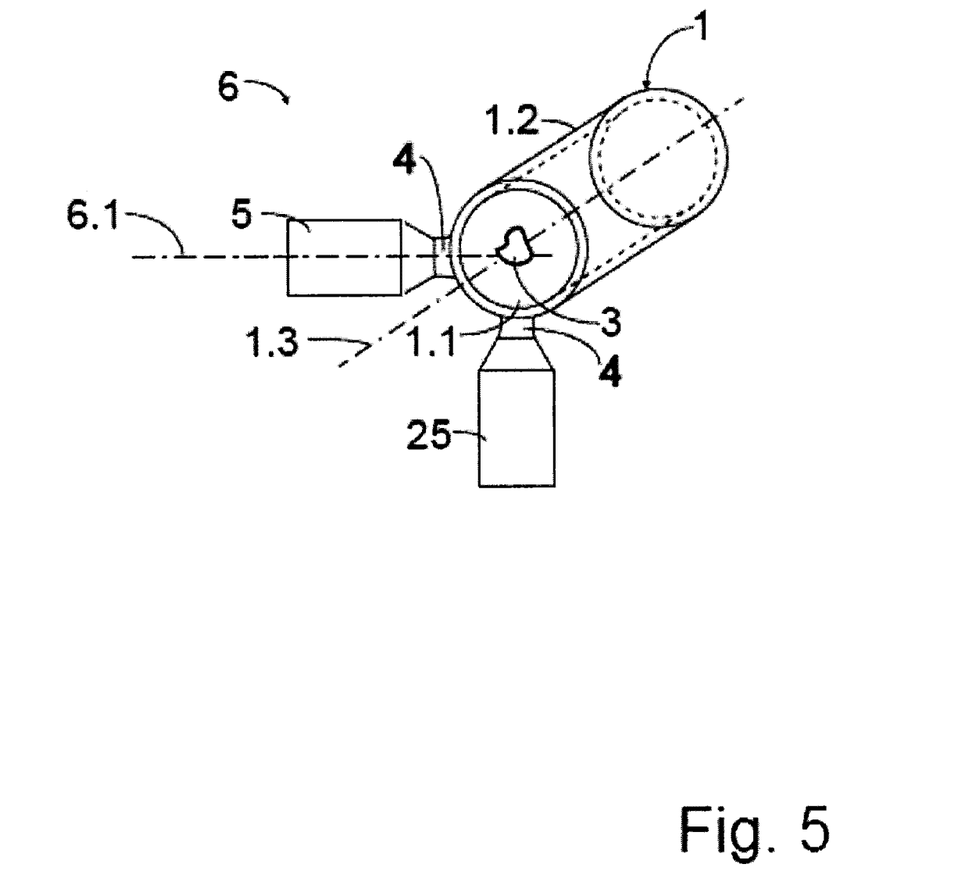
FIG. 5 shows a schematic illustration of a fifth exemplary embodiment of a specimen delimiting element together with a specimen, an immersion medium, an immersion objective of a microscope, and an illumination objective of the microscope.

In the case of a fifth exemplary embodiment of the specimen delimiting element 1 as illustrated in FIG. 5, said specimen delimiting element is embodied as a hollow cylinder, the interior cylinder surface of which is the specimen-side side surface 1.1 and the exterior cylinder surface of which is the objective-side side surface 1.2.

The immersion objective 5 of the microscope 6 is oriented with its optical axis 6.1 orthogonal to the cylinder longitudinal axis 1.3 of the specimen delimiting element 1 and is in contact with the objective-side side surface 1.2 via the immersion medium 4.

In addition, an illumination objective 25 of the microscope 6 is present in a manner oriented orthogonally both to the cylinder longitudinal axis 1.3 and to the optical axis 6.1.

A specimen 3, illustrated in a simplified manner, is present in the specimen delimiting element 1 and is enveloped by the side surfaces 1.1, 1.2. The specimen 3 is illuminated or illuminatable by means of the illumination objective 25.

If the optical axis 6.1 of the immersion objective 5 and the illumination effected by the illumination object 25 are directed into the same space within the specimen delimiting element 1, the specimen 3 illuminated in this way can be observed through the immersion objective 5.

In this case, in order to avoid undesired stray radiation from off-focus regions of the specimen 3, it is advantageous if the illumination is effected in a narrowly delimited volume, for example in a so-called light sheet.

The pores 2 can be distributed and formed in the specimen delimiting element 1 in the manner such as has already been explained in respect of any of the first to fourth exemplary embodiments.

The arrangement illustrated in FIG. 5 schematically illustrates a microscope 6 in the form of a light sheet microscope and/or a laser scanning microscope besides the fifth exemplary embodiment of the specimen delimiting element 1.

Figure 6:
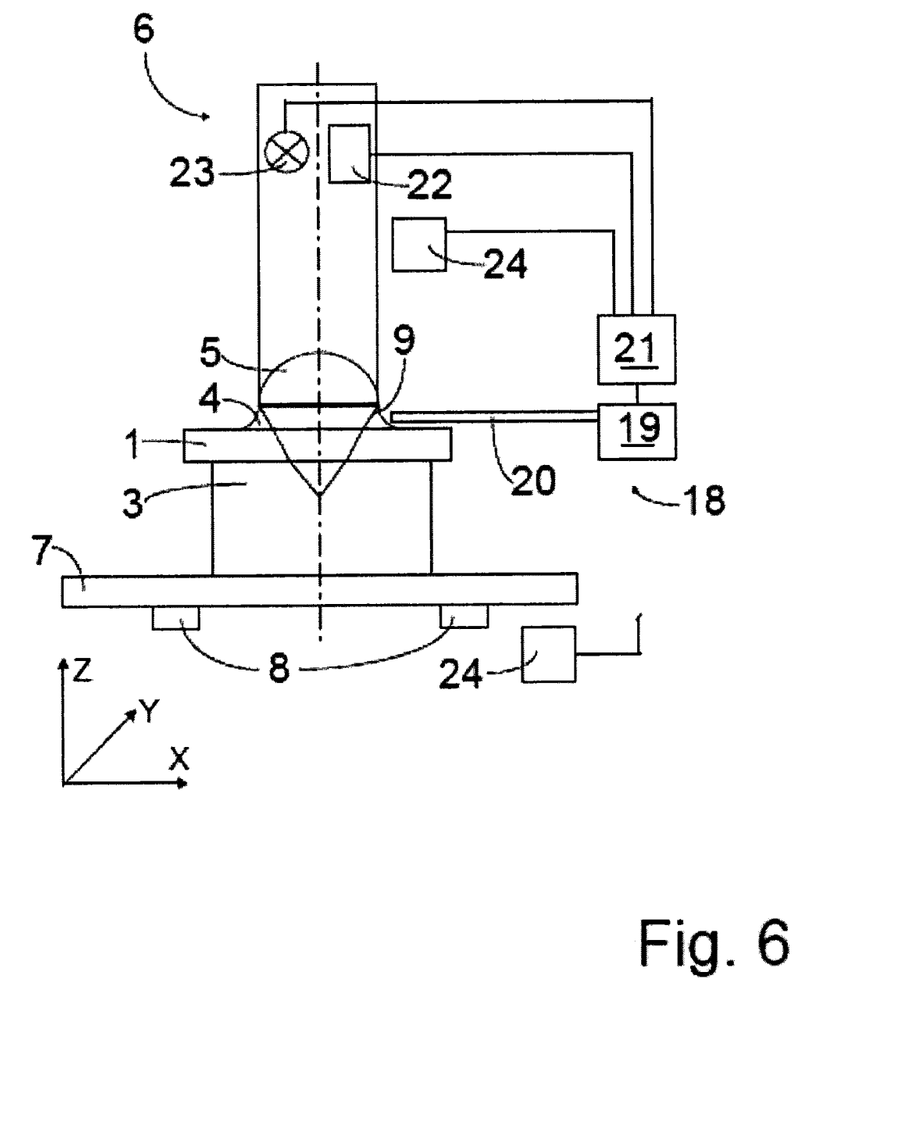
FIG. 6 shows a schematic illustration of one exemplary embodiment of a microscope with an immersion media interchange device.

In order to be able to effectively use the specimen delimiting element 1, a modified microscope 6 such as is illustrated in FIG. 6 is advantageous.

The microscope 6 comprises a specimen slide mount 8 for mounting a specimen slide 7. Furthermore, an immersion media interchange device 18 is present. The latter comprises an immersion media feed 20 for feeding the immersion medium 4 to the specimen delimiting element 1. The immersion media feed 20 is connected to a pump unit 19 for the controlled transport of the immersion medium 4 from a supply container (not illustrated) through the immersion media feed 20 to the specimen delimiting element 1. The pump unit 19 is drivable by means of a control unit 21.

An illumination radiation and/or an excitation radiation are/is generatable and providable by means of a light source 23. The specimen 3 is illuminatable and/or excitable by means of the provided illumination radiation and/or the excitation radiation.

The observation radiation 9 is detectable by means of a detection unit 22. The light source 23 and the detection unit 22 are connected to the control unit 21 in a manner suitable for data exchange and are drivable by means of the control unit 21. Data of the detected observation radiation 9 are communicatable to the control unit 21 by the detection unit 22. The control unit 21 is configured to store and/or evaluate the communicated data of the detected observation radiation 9.

Depending on the data of the detected observation radiation 9 and/or depending on the results determined during the evaluation thereof, the pump unit 19, the detection unit 22, the light source 23, a drive 24 for adjusting the immersion objective 5 in the Z-direction Z and/or optionally a drive 24 for adjusting the specimen slide mount 8 in an X-Y-plane XY are drivable.

In this case, the observation radiation 9 may be a reflected proportion of the illumination radiation and/or of the excitation radiation. In further embodiments of the microscope 6 and in further configurations of a microscopy method, the observation radiation 9 is a radiation brought about by the excitation radiation, such as a fluorescence radiation.

Optionally, in a further embodiment of the microscope 6, provision is made of an immersion media discharge for transporting away the exchanged immersion medium 4.

Furthermore, in a further embodiment of the microscope 6, there is at least one sensor for detecting the temperature of the specimen delimiting element 1, of the specimen 3 and/or of the immersion medium 4.

The above-described embodiments of the specimen delimiting element 1, optionally together with embodiments of the microscope 6, are useable in a microscopy method. To that end, a specimen delimiting element 1 and specimen 3 to be observed are provided. The specimen 3 is applied or placed onto the specimen slide 7 and delimited, for example covered or encompassed, by the specimen delimiting element 1. Afterward, the objective-side side surface 1.2 is wetted with the immersion medium 4. The immersion objective 5 is contacted with the immersion medium 4. For the purpose of generating, exciting and/or providing the observation radiation 9, the specimen is illuminated with the illumination radiation and/or with the excitation radiation.

The specimen 3 is observed by detecting a least one beam of the observation radiation 9 through the immersion objective 5 and through the specimen delimiting element 1.

Figure 7A:
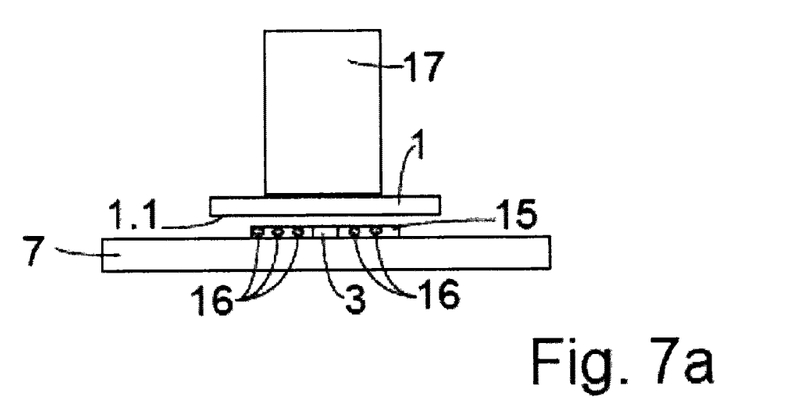
FIG. 7a shows a schematic illustration of one configuration of a microscopy method in a first method state.

In one possible configuration, the microscopy method is suited to observing embedded specimens 3. Prior to the observation, the specimen 3 embedded in an embedding medium 15 is provided, as is illustrated in FIG. 7a. The embedding medium 15 contains undesired air bubbles 16.

Figure 7B:
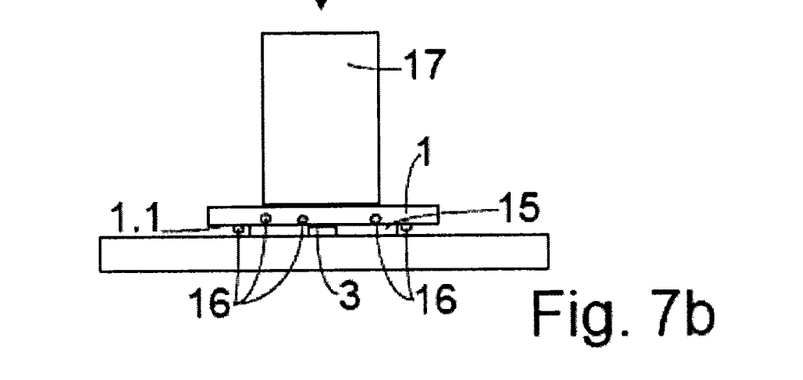
FIG. 7b shows a schematic illustration of one configuration of a microscopy method in a second method state.

The specimen delimiting element 1, the specimen-side side surface 1.1 of which is porous and has no liquid-tight sealing layer 13, is placed onto the embedded specimen 3 by means of a manipulator 17 in the Z-direction Z, as is illustrated in FIG. 7b. Owing to the force influences occurring here on the embedded specimen 3, some of the air bubbles 16 are forced out of the embedded specimen 3 laterally in the X- and/or Y-direction X, Y.

Air bubbles 16 that are not forced out laterally enter the specimen delimiting element 1 through the specimen-side side surface 1.1, pass through the pores 2 (see FIGS. 1 to 4) of the specimen delimiting element 1 into an environment of the specimen 3 and are removed from the embedded specimen 3 in this way.

Figure 7C:
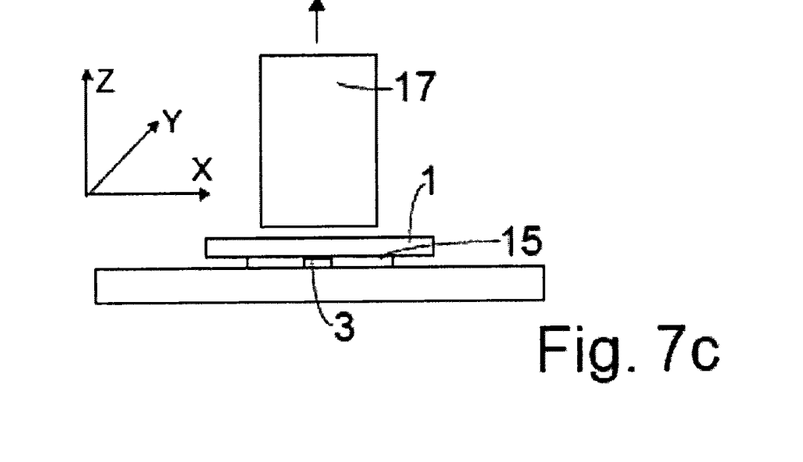
FIG. 7c shows a schematic illustration of one configuration of a microscopy method in a third method state.

In FIG. 7c, the manipulator 17 is lifted off from the specimen delimiting element 1 in the Z-direction Z and is removed. The embedded specimen 3 is covered by the specimen delimiting element 1.

The specimen delimiting element 1 assumes the refractive index of the embedding medium 15. In the further microscopy method, an immersion medium 4 is chosen and applied to the specimen delimiting element 1, with the refractive index thereof matching the refractive index of the embedding medium 15, that is to say being similar or identical thereto.

Both the covering of the embedded specimen 3 and the exchange of the immersion medium 4 are automated in further configurations of the method.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Specimen delimiting (or covering) element
1.1 Specimen-side side surface
1.2 Objective-side side surface
1.3 Cylinder longitudinal axis
2 Pore
3 Specimen
4 Immersion medium
5 Immersion objective
6 Microscope
6.1 Optical axis
7 Specimen slide
8 Specimen slide mount
9 Observation beam
10 Focal plane
11 Pore gradient
12 Pore-free layer
13 Sealing layer
14 Medium
15 Embedding medium
16 Air bubble
17 Manipulator
18 Immersion media interchange device
19 Pump unit
20 Immersion media feed
21 Control unit
22 Detection unit
23 Light source
24 Drive
25 Illumination objective
d Thickness

What is claimed is:

1. A specimen delimiting element for use in a microscope having a specimen mount for mounting a specimen slide, and an immersion objective, comprising:
at least in one region, a nano-porous material which is transparent to at least one observation radiation which is capturable by means of a microscope, wherein the mean pore diameter of said nano-porous material is smaller than the wavelength of the observation radiation
wherein a proportion of at least 5% of the volume of the nano-porous material is taken up by the pores at least in portions of said nano-porous material,
said nano-porous material having an open porosity,
said mean pore diameter being at most 1000 nm,
the number of pores per unit volume of the nano-porous material and/or the mean pore diameter changes or change along at least one extent of the specimen delimiting element, such that a pore gradient is formed in the specimen delimiting element,
said pore gradient has at least one gradient portion in which no porosity is present, such that a full separation preventing from mixing of a specimen medium on one side surface of the specimen delimiting element and an immersion medium on an opposite side surface of the specimen delimiting element is effected by means of the specimen delimiting element, and
wherein a respective pore gradient is formed proceeding from two mutually opposite side surfaces of the specimen delimiting element, wherein the pore gradients are formed in a mutually opposing fashion with regard to the number of pores per unit volume of the material and/or the mean pore diameter.

2. The specimen delimiting element as claimed in claim 1, wherein said mean pore diameter is in a value range of 0.5 nm to 100 nm.

3. The specimen delimiting element as claimed in claim 1, wherein said mean pore diameter is in a value range of 1 nm to 10 nm.

4. The specimen delimiting element as claimed in claim 1, wherein said observation radiation has a wavelength selected from a wavelength range of 200 to 2000 nm.

5. The specimen delimiting element as claimed in claim 1, further comprising a solidified or liquid medium having known optical properties filing said pores, wherein the solidified or liquid medium remains in the specimen delimiting element.

6. The specimen delimiting element as claimed in claim 1, wherein said nano-porous material is a glass, a plastic or a plastics mixture.

7. A microscopy method, comprising the following steps:
providing a specimen;
covering the specimen with a specimen delimiting element, said specimen delimiting element comprising: at least in one region, a nano-porous material which is transparent to at least observation radiation which is capturable by means of a microscope, wherein the mean pore diameter of said nano-porous material is smaller than the wavelength of the observation radiation,
wherein a proportion of at least 5% of the volume of the nano-porous material is taken up by the pores at least in portions of said nano-porous material,
said nano-porous material having an open porosity,
said mean pore diameter being at most 1000 nm,
the number of pores per unit volume of the nano-porous material and/or the mean pore diameter changes or change along at least one extent of the specimen delimiting element, such that a pore gradient is formed in the specimen delimiting element,
said pore gradient has at least one gradient portion in which no porosity is present, such that a full separation preventing from mixing of a specimen medium on one side surface of the specimen delimiting element and an immersion medium on an opposite side surface of the specimen delimiting element is effected by means of the specimen delimiting element, and
wherein a respective pore gradient is formed proceeding from two mutually opposite side surfaces of the specimen delimiting element, wherein the pore gradients are formed in a mutually opposing fashion with regard to the number of pores per unit volume of the material and/or the mean pore diameter;
filling the pores of the specimen delimiting element with an immersion medium and/or with a specimen medium,
wetting the specimen delimiting element with an immersion medium,
contacting an immersion objective with the immersion medium, and observing the specimen by detecting at least one beam of the observation radiation through the immersion objective and through the specimen delimiting element.

8. The microscopy method as claimed in claim 7, wherein a specimen embedded in an embedding medium is provided as the specimen.

9. A microscope having a specimen mount for mounting a specimen slide, a specimen delimiting element and an immersion objective for carrying out the method having the features and limitations as set forth in claim 8.

10. The microscope as claimed in claim 9, further comprising
- an immersion media interchange device, said immersion media interchange device having
- an immersion media feed for feeding an immersion medium to said specimen delimiting element,
- a pump unit for the controlled transport of the immersion medium from a supply container through the immersion media feed to the specimen delimiting element, and
- a control unit for driving the pump unit.

* * * * *